United States Patent [19]

Kostuch et al.

[11] Patent Number: 5,418,195
[45] Date of Patent: May 23, 1995

[54] POROUS CERAMIC GRANULES

[75] Inventors: Jacek A. Kostuch, Par; Jonathan A. Hearle, Falmouth, both of United Kingdom

[73] Assignee: ECC International Limited, United Kingdom

[21] Appl. No.: 143,072

[22] Filed: Oct. 26, 1993

[30] Foreign Application Priority Data

Oct. 28, 1992 [GB] United Kingdom ............... 9222638

[51] Int. Cl.⁶ ............... C04B 38/00; C04B 35/16
[52] U.S. Cl. .................... 501/80; 501/128; 501/130; 501/153
[58] Field of Search ............... 501/80, 128, 153, 130

[56] References Cited

U.S. PATENT DOCUMENTS

| 1,929,425 | 10/1933 | Hermann | 501/80 X |
|---|---|---|---|
| 2,265,540 | 12/1941 | Nichols | 501/153 X |
| 2,297,539 | 9/1942 | Diamond | 501/80 |
| 4,123,284 | 10/1978 | Rieger | 501/84 |
| 4,226,819 | 10/1980 | Oganesian | 501/80 X |
| 4,320,202 | 3/1982 | Yamamoto et al. | 501/80 |
| 4,424,280 | 1/1984 | Malric | 501/84 |
| 4,824,810 | 4/1989 | Lang et al. | 501/84 |
| 4,937,209 | 6/1990 | Jones et al. | 501/80 |
| 4,937,210 | 6/1990 | Jones et al. | 501/80 |
| 5,032,549 | 7/1991 | Lang et al. | 501/84 |
| 5,055,429 | 10/1991 | James et al. | 501/80 |
| 5,175,131 | 12/1992 | Lang et al. | 501/84 |
| 5,244,958 | 9/1993 | Goodman | 524/447 |

FOREIGN PATENT DOCUMENTS

| 2051807 | 10/1991 | Canada. | |
|---|---|---|---|
| 0009310 | 4/1980 | European Pat. Off.. | |
| 0279056 | 8/1988 | European Pat. Off.. | |
| 0451928 | 10/1991 | European Pat. Off.. | |
| 697712 | 9/1953 | United Kingdom. | |
| 1205896 | 9/1970 | United Kingdom. | |
| 1585104 | 2/1981 | United Kingdom. | |
| 2067174 | 7/1981 | United Kingdom. | |
| 0718422 | 2/1980 | U.S.S.R. | 501/80 |
| 1020410 | 5/1983 | U.S.S.R. | 501/80 |
| 1206242 | 1/1986 | U.S.S.R. | 501/80 |

Primary Examiner—Mark L. Bell
Assistant Examiner—David Sample
Attorney, Agent, or Firm—Klauber & Jackson

[57] ABSTRACT

There is disclosed a process for preparing porous ceramic granules, comprising (a) preparing a foam from an aqueous mixture of a particulate aluminosiliceous material and a fluxing material;

(b) dividing the foam into discrete particles to form granules; and (c) calcining the granules at an elevated temperature such that sintering of the aluminosiliceous particles occurs.

17 Claims, No Drawings

POROUS CERAMIC GRANULES

This invention relates to a method for preparing porous lightweight granules from aluminosiliceous raw materials, and especially from clay minerals.

Porous ceramic granules have desirable properties for a number of different uses. They are, for example, useful as fillers for plastics compositions in which it is necessary for them to have a low bulk density, and also a high strength to be able to resist the high compressive and shear stresses to which a plastics composition is exposed during compounding. They can also advantageously be used for cat litter, in which case strength and low bulk density are again desirable properties, but in addition they should have high porosity in order to absorb approximately their own weight of water. They are also useful for incorporation in household cleaning and polishing compositions, in which low bulk density and high strength are again desirable properties, and as a carrier medium for chemicals such as insecticides and pesticides, or for immobilising biological macromolecular material, such as enzymes or biological cells, in which case the granules need to have a high surface area, a low bulk density and an interconnecting pore structure. The porous ceramic granules are also useful for incorporation into ceramic compositions to make relatively light weight ceramic articles such as kiln furniture. Such ceramic compositions generally comprise a finely divided plastic clay such as ball clay, alumina, talc and a highly aluminous refractory aggregate, which may consist predominantly of mullite.

U.S. Pat. No. 4,824,810 describes a porous ceramic material prepared by firing a foamed mixture of a clay and optionally an aggregate.

According to a first aspect of the present invention, there is provided a process for preparing a ceramic granular material, comprising (a) preparing a foam from an aqueous mixture of a particulate aluminosiliceous material and a fluxing material;

(b) dividing the foam into discrete particles to form granules; and (c) calcining the granules at an elevated temperature;

wherein the granules are calcined at an elevated temperature such that, in the presence of a sufficient amount of the fluxing material, sintering of the aluminosiliceous particles occurs.

The aluminosiliceous material is preferably a clay mineral. The clay mineral may be of the kandite type, for example kaolinite, dickite, nacrite or halloysite, or of the smectite type, for example bentonite, montmorillonite, hectorite, sepiolite or beidellite. The clay mineral may be hydrous or calcined. Relatively lightly calcined clay products such as metakaolin are suitable.

In order that the product granules should be sufficiently strong to be able to resist compressive and shearing forces when used as a filler for a plastics composition, a degree of sintering must occur during the calcining step. The fluxing material is essential for this purpose; the amount of fluxing material used should be sufficient that sintering occurs during the calcination step and, normally, this will require at least 5% of the fluxing material by weight of the mixture of the clay mineral and fluxing material. The mixture of the aluminosiliceous material and the fluxing material will normally contain no more than about 50% of the fluxing material.

Clay minerals seldom occur in nature in a pure state, but are generally found in association with other minerals, such as quartz, feldspar and mica. Mica and feldspar have a fluxing effect on clay minerals when mixtures containing them are heated to a temperature above about 1050° C. When the aluminosiliceous material is a clay mineral, the fluxing material is therefore conveniently mica and/or feldspar, which may be added separately, or may be already in association with the clay mineral or both. When the aluminosiliceous material is other than a clay mineral, mica and feldspar are still convenient fluxing materials.

The mixture of the aluminosiliceous material and the fluxing material preferably has a particle size distribution such that all of the particles have a diameter smaller than 50 $\mu$m, and most preferably substantially all of the particles have a diameter smaller than 20 $\mu$m. The mixture of the aluminosiliceous material (preferably clay mineral) and the fluxing material may advantageously have a composition defined by the following ranges:

| clay mineral | 55–95% by weight |
| quartz | 0–45% by weight |
| feldspar | 0–45% by weight |
| mica | 0–45% by weight | provided that at least 5% by weight of the mixture is constituted by mica and/or feldspar.

Preferably the solid material comprising the aluminosiliceous material and the fluxing material is mixed with sufficient water to form a dispersed suspension preferably containing from 50 to 68% by weight of the dry solid material. Most preferably the percentage by weight of the dry solid material is in the range from 55 to 65% by weight. The aqueous suspension will typically be dispersed with a dispersing agent, preferably in an amount of from 0.05 to 1% by weight, based on the weight of the dry solid material. The dispersing agent may be a water soluble condensed phosphate salt, a water soluble salt of a polysilicic acid or a water soluble salt of a poly(acrylic acid) or a poly(methacrylic acid).

It should be noted that it is not essential that the aqueous mixture of the aluminosiliceous material and the fluxing material is a dispersed suspension; for example, the aluminosiliceous material and the fluxing material and water may be compounded and formed into a foam in a compounder extruder without the formation of a dispersion.

Before calcining, the granules formed in step (b) are normally pre-dried to avoid possible damage to the granules in the calciner which might result from the rapid evolution of water if the water content of the foamed granules is excessively high. The granules of foam may therefore be dried to a water content of not more than 1% by weight as a separate step, before being introduced into the calciner. Alternatively the foam granules may be introduced directly into a calciner which has a preliminary drying zone. If the drying is performed as a separate step, the granules are preferably dried to a water content of not more than 0.5% by weight.

The dried granules are preferably calcined for at least 5 minutes at a temperature of 1050° C. in order to ensure that sintering of the clay particles occurs. From the point of view of economy, it is unlikely that calcination will need to continue for longer than 25 minutes and at a temperature greater than 1150° C. If the dried granules are calcined for a longer period, or at a higher temperature than those stated, the quality of the product would not necessarily be adversely affected, but the process would become wasteful of energy. Preferably calcination is continued for between 15 and 20 minutes at a temperature in the range of from 1075° to 1125° C. If the granules are to be incorporated into a ceramic composition for preparing a refractory ceramic article, for instance kiln furniture, it may be necessary to calcine the dried granules at a higher temperature, for example up to 1600° C., and for a longer time, for example up to about 24 hours. As a general rule, as the calcination temperature, and the time for which the foamed material is exposed to the calcination temperature, are increased, there is a tendency for the calcined product to become more vitrified. This means that the material of the cell walls beings to flow, with the result that intercellular walls begin to collapse and the structure becomes one of generally larger cells, which tend to intercommunicate, and fewer, but thicker, cell walls. The nature of the foam composition may also affect the porosity of the calcined product; as a general rule, the greater the proportion of fluxing material in the foamed material to be calcined, the lower will be the temperature at which vitrification becomes apparent.

When the calcination is continued for between 15 and 20 minutes at a temperature in the range of from 1075° to 1125° C., this normally results in a material having a predominantly closed, rather than open, porous structure; this is advantageous if the porous granules are to be used as a plastics filler material, because the closed pores prevent penetration into the pores of the polymeric medium into which the granules are incorporated. When the calcination is conducted at a higher temperature above about 1125° C., for example up to 1600° C., and for a longer time than 20 minutes, for example up to about 24 hours, the resultant product will tend to have an interconnecting pore structure, which is of no disadvantage when the granules are to be used as the aggregate in a ceramic composition from which a light weight ceramic article is to be made.

According to a second aspect of the present invention, there is provided a ceramic granular material prepared by the process of the first aspect of this invention.

According to a third aspect of the present invention, there is provided a ceramic granular material comprising a mass of porous granules substantially all of which have a crush strength of at least 15N and each of which is composed of aluminosiliceous particles sintered together, the bulk density of the material being no greater than 0.75 g.cm$^{-3}$.

The crush strength for a single granule prepared in accordance with the present invention is preferably at least 15N, more preferably at least 50N. Preferably, the crush strength is no more than 200N and the crush strength for a packed bed of granules of diameter 25 mm and depth 25 mm is preferably at least 2 kN and preferably no more than 10 kN.

Granules prepared in accordance with the present invention may have a largest dimension of up to 10 mm in size.

Granules prepared in accordance with the present invention preferably have a bulk density of at least 0.120 g.cm$^{-1}$. Preferably, the bulk density is no greater than 0.700 g.cm$^{-3}$ although, in some circumstances, such as where the granular material is to be incorporated into a ceramic composition for preparing a refractory ceramic article, it may be as high as 0.75 g.cm$_{-3}$, in which case the crush strength of the individual granules may be as high as 150N.

The foam formed in step (a) may be formed into discrete particles by means of the atomising device in the chamber of a spray dryer, if the final granule size is required to be relatively small, for example in the size range from about 50 to about 250 μm. Alternatively, if larger granules are required, the foam may be forced through a plurality of small apertures, for example by means of an extruder. Generally it is necessary to flocculate the mixture of the clay mineral and the fluxing material in the aqueous suspension or foam before the aqueous suspension or foam is extruded.

The foam may be prepared by any one of the following five methods:

(a) A dispersed aqueous suspension of solid material comprising a mixture of a clay mineral and a fluxing material, prepared as described above, is mixed with from 200 to 1000 ppm (parts by weight per million parts by weight of dry solid material) of an anionic or nonionic surfactant, which may be, for example, a sodium salt of a linear alkyl ethoxy sulphate. Preferably the quantity of the surfactant used is in the range from 600 to 800 ppm. It is preferred to use an anionic or a nonionic surfactant because a cationic surfactant would tend to flocculate the suspension of the solid material. The mixture thus formed is introduced into one end of an elongated drum, rotating about a horizontal, longitudinal axis. The other end of the drum is partially closed by an annular plate which acts as a weir, the height of the weir being such that a layer of liquid of depth in the range from 5 to 15 mm is maintained against the wall of the drum. As the drum rotates the suspension undergoes a tumbling action, and air is entrained in the suspension to form a foam of consistent properties. The foam thus formed is divided into particles, dried and calcined as described above.

(b) A dispersed aqueous suspension of solid material comprising a mixture of a clay mineral and a fluxing material prepared as described above is introduced into one end of a rotating drum of the type described in (a) above and is mixed therein with an aqueous foam which is separately prepared in a foam generator. The foam may be generated, for example, by forcing a mixture of air, water and a surfactant under pressure through a fine mesh. The foam conveniently consists of bubbles of sizes in the range from 5 to 100 μm, and most advantageously of bubbles in the size range from 10 to 60 μm. The foam conveniently has a water content of from 20 to 30 kg per cubic meter of foam, and in particular from 22 to 26kg.m$^{-3}$. The volume of separately generated foam added to the aqueous suspension is dependent on the density required for the final product, and is given by the equation:

$$p = m/(v_s + v_f F) \qquad (1)$$

where, p is the density of the foamed product at a water content of 0% in kg.m$^{-3}$;

m is the mass of the solid material in the slurry in kg;

$v_s$ is the volume of the aqueous suspension before the foam is added in m$^3$;

$v_f$ is the volume of the foam added in m$^3$; and

F is the foam degradation factor which depends upon the stability of the foam (a perfectly stable foam having the value F=1). We have found a value of F=0.21 to be typical.

The foam thus formed is divided into particles, dried and calcined as described above.

(c) A dispersed aqueous suspension of solid material comprising a mixture of a clay mineral and a fluxing material prepared as described above is introduced into the feed end of an extruder together with an appropriate quantity of a foam which is separately generated as described in (b) above. The extruder is preferably co-rotating, twin-screw compounder extruder with inlets provided along the length of its casing to permit the introduction of liquid additives into the material passing through the extruder. If the separately generated foam has been prepared using an anionic or nonionic surfactant it is necessary to introduce an acid, for example a mineral acid such as hydrochloric or sulphuric acid, or a flocculant for the solid material through one of the inlets in the casing of the extruder in order to flocculate the solid material. If, on the other hand, the separately generated foam is generated using a cationic surfactant, for example a higher alkyl trimethyl quaternary ammonium chloride, wherein the higher alkyl group has from 12 to 20 carbon atoms, the suspension of the solid material is flocculated on contact with the foam. The foam thus formed is divided into particles, dried and calcined as described above.

(d) A dispersed aqueous suspension of a solid material is prepared in which the solid material comprises a clay mineral, a fluxing material and, in addition, a water insoluble, inorganic carbonate which evolves carbon dioxide gas on contact with an acid. The carbonate is preferably an alkaline earth metal carbonate. The amount of the carbonate added is preferably such that the ratio of the weight of the carbonate to the weight of the mixture of the clay mineral and the fluxing material is in the range from 1:9 to 1:1, and most preferably in the range from 1:4 to 1:2. The aqueous suspension is introduced into the feed inlet of an extruder of the type described in (c) above, and an acid is introduced through one of the inlets in the casing of the extruder. The acid is preferably a mineral acid, for example hydrochloric or sulphuric acid. The amount of the acid introduced is given by the equations:

$$m_c/v_{ft}=p_f \quad (2)$$

where, $m_c$ is the mass of solids in kg in 1 dm$^3$ of the feed suspension;

$v_{ft}$ is the volume of the final dried foam product in dm$^3$ containing $m_c$ kg of solids; and $p_f$ is the required density in kg.dm$^{-3}$ of the final product.

$$v_{ft}-v_g=1 \quad (3)$$

where, $v_g$ is the volume of gas in dm$^3$ required to be added to 1 dm$^3$ of the suspension to give a final product of the required density.

$$v_a=(v_g.M.n)/V.g \quad (4)$$

where, $v_a$ is the volume in dm$^3$ of the acid;
M is the molecular weight in g of the acid;

n is the number of moles of the acid required to produce 1 mole of carbon dioxide gas;

V is the volume in dm$^3$ occupied by a mole of carbon dioxide gas at ambient temperature and pressure and g is the specific gravity of the acid.

The foam thus formed is divided into particles, dried and calcined as described above.

(e) Dry solid material comprising a mixture of a clay mineral and a fluxing material and sufficient water to form a suspension containing from 50 to 68% by weight of solid material, and preferably from 58 to 65% by weight of solid material, are added separately to the feed inlet of an extruder of the type described in (c) above, and there are added to successive inlets disposed along the length of the casing of the extruder, either:

(i) a dispersing agent, followed by an aqueous foam separately prepared using an anionic or non-ionic surfactant, followed by an acid or flocculant for the solid material; or (ii) a dispersing agent followed by an aqueous foam separately prepared using a cationic surfactant; or (iii) an aqueous foam separately prepared using an anionic or non-ionic surfactant or an aqueous foam separately prepared using a cationic surfactant.

In each case the foam thus formed is divided into particles, dried and calcined as described above.

The invention will now be illustrated by reference to the following Examples.

EXAMPLE 1

A by-product from a kaolin clay refining plant had a particle size distribution such that 58% by weight consisted of particles having an equivalent spherical diameter smaller than 2 μm and the following mineralogical composition:

| | |
|---|---|
| kaolinite | 68% by weight |
| mica | 9% by weight |
| quartz | 3% by weight |
| feldspar | 20% by weight. |

The solid material was dispersed in water containing 0.3% by weight, based on the weight of dry solid material, of a sodium polyacrylate dispersing agent, and the pH of the suspension was adjusted to 7.5 with a 0.1M solution of sodium hydroxide. Three different suspensions were prepared, each containing sufficient water to give a dry solids content of 65% by weight, but there was added to each a different quantity of an anionic surfactant which was a linear alkyl ethoxy sulphate.

Each suspension was tumbled in a rotating drum of the type described under method (a) above for two hours after which the resultant foam was poured into a tray and dried in an oven for 16 hours at 80° C. The dried product was crushed and the crushed particles were calcined at 1100° C. for 15 minutes. The calcined particles were then subjected to particle size classification on vibrating sieves, and the fractions consisting, respectively, of particles of diameter smaller than 4 mm and particles of diameter between 10 and 20 mm were retained. Samples of these two fractions were tested for bulk density by placing a weighed sample in a glass measuring cylinder and tapping the base of the cylinder ten times on a rubber mat to shake down the granules. The volume occupied by the granules was then read and the bulk density calculated.

The results obtained are set forth in Table 1 below.

TABLE 1

| Quantity of surfactant (ppm) | Bulk density (g · cm⁻³) of granules of size | |
|---|---|---|
| | 0–4 mm | 10–20 mm |
| 200 | 0.616 | 0.287 |
| 400 | 0.593 | 0.177 |
| 600 | 0.657 | 0.286 |

In each case the crush strength of the granules, as measured by crushing an individual granule of diameter approximately 3 mm, by means of a head to which a vertically downward force was transmitted through a load cell by a fine screw, was in the range from 20 to 25N.

EXAMPLE 2

The experiment described in Example 1 was repeated except that five suspensions were prepared each containing 600 ppm of the surfactant but with different amounts of water to give five different percentages by weight of dry solid material. In each case the calcined granules were subjected to particle size classification and samples from the fractions consisting of particles smaller than 4 mm and between 10 and 20 mm, respectively, were tested for bulk density.

The results obtained are set forth in Table 2.

TABLE 2

| % by weight of solid material | Bulk density (g · cm⁻³) of granules of size | |
|---|---|---|
| | 0–4 mm | 10–20 mm |
| 60 | 0.515 | 0.154 |
| 65 | 0.657 | 0.286 |
| 66 | 0.639 | 0.268 |
| 67.5 | 0.616 | 0.243 |
| 68.5 | 0.509 | 0.142 |

In each case the crush strength of the granules, as measured by crushing an individual granule of diameter approximately 3 mm, by means of a head to which a vertically downward force was transmitted through a load cell by a fine screw, was in the range from 20 to 25N.

EXAMPLE 3

13.75 kg of a ball clay was mixed with sufficient water to form a suspension containing 65% by weight of dry solid material and with 0.3% by weight, based on the weight of dry solid material, of the same sodium polyacrylate dispersing agent as was used in Example 1 and with sufficient sodium hydroxide to raise the pH of the suspension to 7.5.

The ball clay had a particle size distribution such that 85% by weight consisted of particles having an equivalent spherical diameter smaller than 2 $\mu$m and the following mineralogical composition:

| | |
|---|---|
| kaolinite | 56% by weight |
| mica | 34% by weight |
| quartz | 10% by weight |

The suspension was introduced into the rotating drum described in Example 1 above, and there was also introduced into the drum 10 liters of foam which was separately generated by forcing a mixture of water, air and an anionic surfactant which was a sodium salt of a linear alkyl ethoxy sulphate through a fine mesh. The mixture was tumbled in the drum for 2 hours, and the resultant foam was found to have a density of approximately 600 kg/m⁻³. The foam was poured into trays and dried in an oven for 16 hours at 80° C. The dried material was crushed and the granules calcined as described in Example 1 above. The calcined granules were subjected to particle size classification and the fractions consisting of particles smaller than 4 mm and between 10 and 20 mm, respectively, were tested for bulk density. The granules smaller than 4 mm were found to have a bulk density of 0.520 g.cm⁻³ and the granules of size between 10 and 20 mm were found to have a bulk density of 0.158 g.cm⁻³. The average crush strength for a granule of diameter approximately 3 mm was 20N.

EXAMPLE 4

A suspension was prepared containing 66% by weight of the same ball clay as was described in Example 3 above and 0.3% by weight, based on the weight of the dry ball clay, of the same sodium polyacrylate dispersing agent. The pH of the suspension was adjusted to 7.5 with sodium hydroxide. The suspension was metered into the feed inlet of a twin screw, co-rotating compounder extruder together with a foam which had been separately prepared by passing under pressure through a fine mesh a mixture of air, water and a cationic surfactant, which was a higher alkyl trimethyl quaternary ammonium chloride, the higher alkyl component being a mixture of alkyl groups having from 13 to 15 carbon atoms. The amount of foam added was such that there were present 5 liters of foam per kilogram of ball clay suspension. The mixed foam was found to have a density of 500 kg.m⁻³. The mixed foam was extruded through a plurality of apertures of diameter 3 mm and the resultant noodles were chopped into granules which were dried in an oven for 16 hours at 80° C. and calcined as described in Example 1 above. The product granules were found to have a bulk density of 0.250 g.cm⁻³. The average crush strength for a granule for a granule of diameter approximately 3 mm was 20N.

EXAMPLE 5

A suspension containing 50% by weight of dry material was prepared, the dry material consisting of 80% by weight of the same ball clay as was described in Example 3 and 20% by weight of ground marble having a particle size distribution such that 60% by weight consisted of particles having an equivalent spherical diameter smaller than 2 $\mu$m. The suspension contained 0.3% by weight, based on the weight of dry material, of the same sodium polyacrylate dispersing agent as was used in Example 1 and sufficient sodium hydroxide to adjust the pH to 7.5. The suspension was introduced into the feed inlet of an extruder of the type described in Example 4 above and a 2M solution of hydrochloric acid was introduced through an inlet provided in the casing of the extruder between the feed inlet and the extrusion apertures. The amount of hydrochloric acid added was 0.02 liters of 2M solution per kilogram of suspension. The foam produced was found to have a degradation factor, F, as referred to in equation (1) above, of 0.6. The foam was extruded through a plurality of apertures of diameter 3 mm and the extruded foam was found to have a density of 550 kg.dm⁻³. The noodles produced by extrusion were chopped and the resultant granules were dried at 150° C. for 1 hour, broken into granules and the granules calcined under the conditions described in Example 1 above. The calcined granules were found to have a bulk density of 0.275 g.cm$^{-3}$. The average crush strength for a granule of diameter approximately 3 mm was 25N.

EXAMPLE 6

The same ball clay as was used in Example 3 was fed as a substantially dry powder at a rate of 15 kg.hr$^{-1}$ into the feed inlet of an extruder of the type described in Example 4 above. At the same time sufficient water to form a suspension containing 60% by weight dry ball clay was injected through inlets provided in the casing of the extruder. There was also introduced, through an inlet situated approximately midway between the feed inlet and the extruder plate, foam which had been separately generated by the method described in Example 3 above. The mixed foam was extruded through a plurality of apertures of diameter 3 mm and the extruded foam was found to have density of 500 kg.m$^{-3}$. The noodles produced by extrusion were dried at 150° C. for 1 hour, broken into granules and the granules were calcined under the conditions described in Example 1 above. The calcined granules were found to have a bulk density of 0.25 g.cm$^{-3}$. The average crush strength for a granule of diameter approximately 3 mm was 25N.

EXAMPLE 7

An English china clay was fed as a substantially dry powder at a rate of 15 kg.hr$^{-1}$ into the feed inlet of an extruder of the type described in Example 4 above. At the same time sufficient water to form a suspension containing 60% by weight of dry china clay was injected through inlets provided in the casing of the extruder. The china clay had a particle size distribution such that 45% by weight consisted of particles having an equivalent spherical diameter smaller than 2 μm. The china clay also had the following mineralogical composition:

|  |  |
|---|---|
| kaolinite | 85% by weight |
| mica | 12% by weight |
| quartz | 1% by weight |
| feldspar | 2% by weight |

There was also introduced, through an inlet situated approximately midway between the feed inlet and the extruder plate, foam which had been separately generated by the method described in Example 3 above. The foamed clay mixture was extruded through a plurality of apertures of diameter 20 mm and the extruded foamed clay was found to have a density of 550 kg.m$^{-3}$. The noodles produced by extrusion were dried for 16 hours at 80° C. and the dried noodles were loaded into refractory saggars and were passed through a calcining tunnel kiln. The residence time in the tunnel kiln was 24 hours and the maximum temperature to which the noodles were exposed was 1525° C. The calcined noodles were crushed in a jaw crusher and the crushed material was screened on sieves having aperture sizes of 2 mm, 1 mm and 0.5 mm respectively. The fraction of the crushed material consisting of particles in the size range 1-2 mm was tested for bulk density by the method described in Example 1 above.

The fraction of the crushed material consisting of particles smaller than 0.5 mm was incorporated into a typical ceramic composition suitable for producing kiln furniture according to the recipe given in Table 3 below. The ingredients were mixed together in the dry state and there was then added to the dry mixture, and thoroughly mixed therewith, 8% by weight of water, based on the total weight of dry solid ingredients. The mixture was pressed in its semi-dry state under a pressure of 300 bar to form bars of size 150 mm×15 mm×3 mm. These bars were laid flat on suitable refractory supports, and were fired in a kiln at 1350° C. for 30 minutes. The fired bars were tested for refractoriness under load, modulus of rupture and density. The refractoriness under load test was performed by supporting a bar in a kiln by its two ends only, firing at 1400° C. for 6 hours and measuring the distance in millimeters by which the centre of the fired bar had sagged. The modulus of rupture test was performed by supporting a bar on two spaced apart knife edges at room temperature and applying a progressively increasing load to the bar at a point midway between the two supporting knife edges. The load required to break the bar was recorded and, from a knowledge of the distance apart of the supporting knife edges and the dimensions of the cross section of the bar, the modulus of rupture was calculated.

As a control, the experiment was repeated but using as the feed to the calcining tunnel kiln the same china clay but without the addition of foam. An aqueous suspension of the china clay was dewatered by filterpressing to form a cake containing about 30% by weight of water. The filter cake was shredded and dried in a rotary kiln to a water content of 20% by weight, and the semi-dry clay was then extruded to form bricks which were loaded on to kiln cars for transport through the tunnel kiln.

The recipe for the kiln furniture ceramic composition in each case is given in Table 3 below:

TABLE 3

|  | Parts by Weight | |
|---|---|---|
| Ingredient | Unfoamed China Clay | Foamed China Clay |
| Ball clay | 28 | 28 |
| Talc | 15 | 15 |
| Alumina | 15 | 15 |
| Refractory material (smaller than 0.5 mm) | 42 | 22 |

Note: The amount of the refractory material formed from the foamed china clay was adjusted to give the same volume in the ceramic composition as that provided by the refractory material formed from the unfoamed clay. The refractory material formed from the foamed china clay was found to have a bulk density of 0.60 g.cm$^{-3}$ and the refractory material formed from the unfoamed china clay a bulk density of 1.47 g.cm$^{-3}$. The average crush strength for a granule of diameter approximately 3 mm prepared from the foamed china clay was 135N. The results are set forth in Table 4 below:

TABLE 4

|  | Unfoamed China Clay | Foamed China Clay |
|---|---|---|
| Density of fired bar g · ml$^{-1}$ | 1.92 | 1.61 |
| Modulus of rupture kg · cm$^{-3}$ | 239 | 200 |
| Sag of bar mm | 16 | 21 |

These results show that, while the kiln furniture ceramic material produced from the foamed china clay was approximately 16% less strong than that produced from the unfoamed china clay, the density of the ceramic material produced from the foamed china clay was also reduced by 16%, compared with the material produced from the unfoamed china clay. The less dense material would be easier to handle, and would confer the additional advantage of having a lower thermal capacity which would lead to economy in the thermal energy required for firing the material in the kiln.

We claim:

1. A process for preparing a ceramic granular material, comprising
   (a) preparing a foam from an aqueous mixture of a particulate aluminosiliceous material and a fluxing material, said fluxing material being present as at least 5% by weight of the mixture of the aluminosiliceous material and fluxing material;
   (b) dividing the foam into discrete particles to form granules; and
   (c) calcining the granules at an elevated temperature; wherein the granules are calcined at a temperature of at least 1050° C. for at least 5 minutes such that, in the presence of the fluxing material, sintering of the aluminosiliceous particles occurs.

2. A process according to claim 1, wherein the aluminosiliceous material is a clay mineral.

3. A process according to claim 1, wherein the mixture of the aluminosiliceous material and the fluxing material contains no more than about 50% of the fluxing material.

4. A process according to claim 1, wherein the fluxing material is mica or feldspar.

5. A process according to claim 1, wherein the mixture of the aluminosiliceous material and the fluxing material has a particle size distribution such that substantially all of the particles have a diameter smaller than 50 μm.

6. A process according to claim 1, wherein the mixture of the aluminosiliceous material and the fluxing material has a particle size distribution such that substantially all of the particles have a diameter smaller than 20 μm.

7. A process according to claim 1, wherein, in step (a), the aqueous mixture of aluminosiliceous material and the fluxing material is in the form of a dispersed suspension.

8. A process according to claim 1, wherein the granules formed in step (b) are dried prior to calcination.

9. A process according to claim 8, wherein the granules of foam are dried to a water content of not more than 1% by weight.

10. A process according to claim 1, wherein the crush strength of a resultant single granule is in the range of from 15 to 200N.

11. A process according to claim 1, wherein the resultant final granules have a largest dimension of up to 10 mm in size.

12. A process according to claim 1, wherein the resultant final granules have a bulk density no greater than 0.75 g.cm$^{-3}$.

13. A process for preparing a porous ceramic granular material having a bulk density no greater than 0.75 g.cm$^{-3}$, substantially all the individual granules of the material having a crush strength of at least 15N, comprising:
   (a) preparing a foam from an aqueous mixture of a particulate aluminosiliceous clay mineral and a fluxing material selected from the group consisting of mica and feldspar in an amount of at least 5% by weight based on the weight of the mixture of the clay mineral and the fluxing material;
   (b) dividing the foam into discrete particles to form granules; and
   (c) calcining the granules for at least 5 minutes at a temperature in excess of about 1050° C. so that sintering of the aluminosiliceous particles occurs.

14. A ceramic granular material prepared by the following process:
   (a) preparing a foam from an aqueous mixture of a particulate aluminosiliceous material and a fluxing material, said fluxing material being present as at least 5% by weight of the mixture of aluminosiliceous material and fluxing material;
   (b) dividing the foam into discreet particles to form granules; and
   (c) calcining the granules at an elevated temperature; wherein the granules are calcined at temperature of at least 1050° C. for at least 5 minutes such that, in the presence of the fluxing material, sintering of the aluminosiliceous particles occurs.

15. A ceramic granular material comprising a mass of porous granules substantially all of which have a crush strength of at least 15N and each of which is composed of aluminosiliceous particles sintered together, the bulk density of the material being no more than 0.75 g.cm$^{-3}$.

16. A ceramic composition for preparing a refractory ceramic article, incorporating a ceramic granular material prepared by the following process:
   (a) preparing a foam from an aqueous mixture of a particulate aluminosiliceous material and a fluxing material, said fluxing material being present as at least 5% by weight of the mixture of the aluminosiliceous material and fluxing material;
   (b) dividing the foam into discrete particles to form granules; and
   (c) calcining the granules at an elevated temperature; wherein the granules are calcined at a temperature of at least 1050° C. for at least 5 minutes such that, in the presence of the fluxing material, sintering of the aluminosiliceous particles occurs.

17. A ceramic composition for preparing a refractory ceramic article, incorporating a ceramic granular material comprising a mass of porous granules substantially all of which have a crush strength of at least 15N and each of which is composed of aluminosiliceous particles sintered together, the bulk density of the material being no greater than 0.75 g.cm$^{-3}$.

* * * * *